Feb. 16, 1965 P. H. E. CLAESSON Re. 25,731

CONTACT DEVICE

Original Filed March 8, 1956

INVENTOR

PER HARRY ELIAS CLAESSON

BY Strauch, Nolan & Neale

ATTORNEYS

United States Patent Office

Re. 25,731
Reissued Feb. 16, 1965

25,731
CONTACT DEVICE

Per Harry Elias Claesson, Sportstugevagan 4, Danderyd, Sweden

Original No. 2,924,684, dated Feb. 9, 1960, Ser. No. 570,331, Mar. 8, 1956. Application for reissue Dec. 23, 1963, Ser. No. 342,585
Claims priority, application Sweden, Mar. 11, 1955, 2,335/55
14 Claims. (Cl. 200—104)

Figure 1:
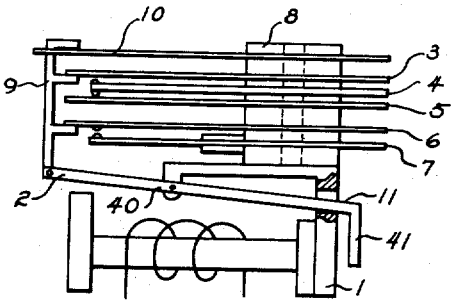
Figure 2:
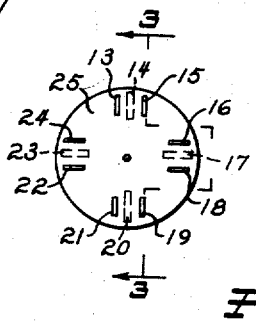
Figure 3:
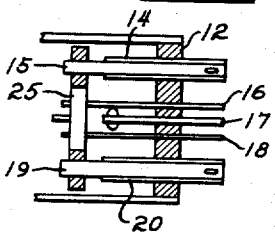
Figure 4:
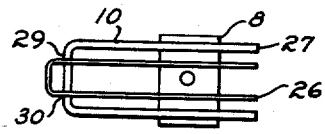
Figure 5:
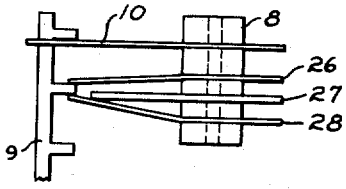
Figures 1, 2, 3:
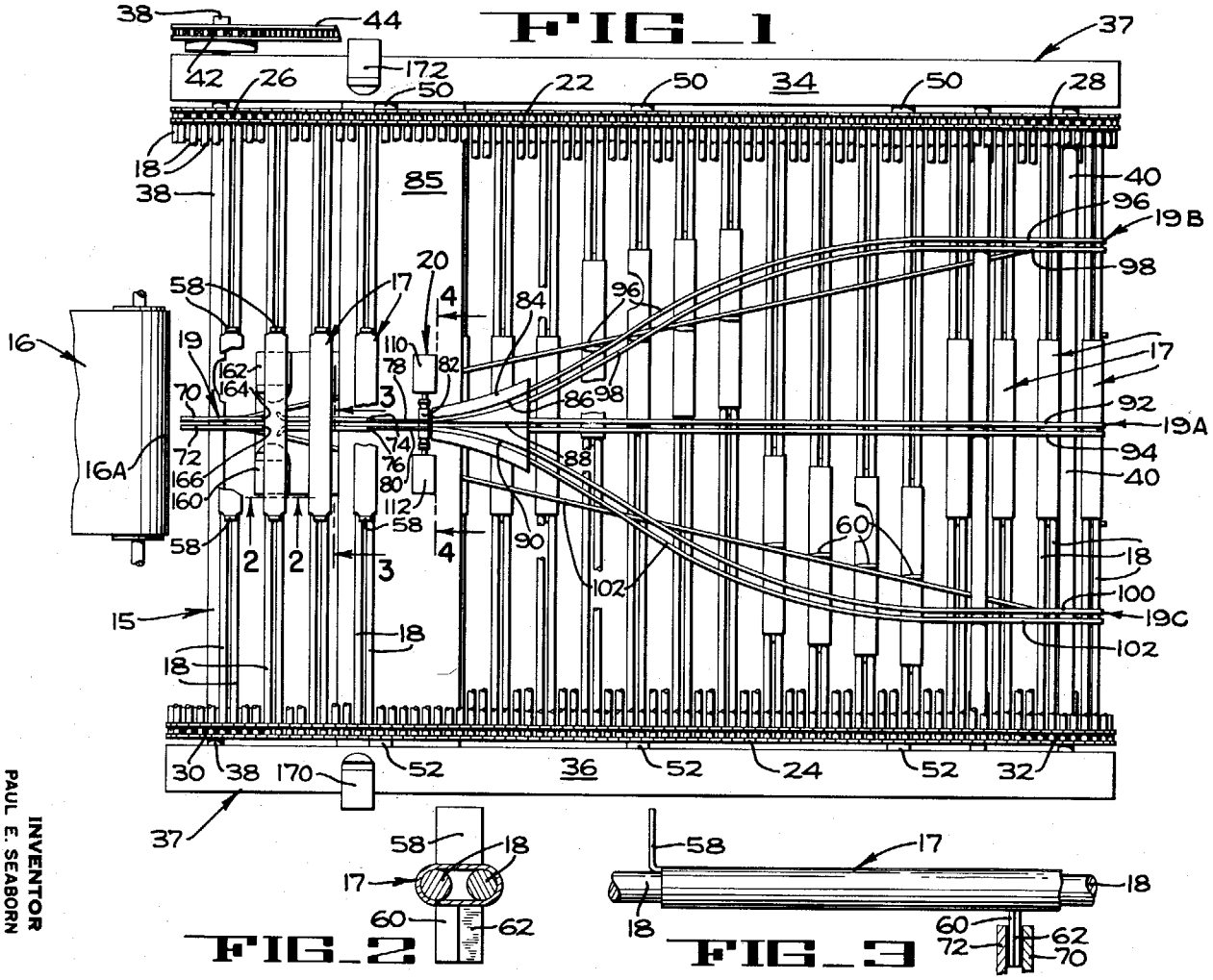

Matter enclosed in heavy brackets [ ] appears in the original patent but forms no part of this reissue specification; matter printed in italics indicates the additions made by reissue.

The present invention relates to contact devices of the kind comprising contact springs and being adapted for so called indirect operation. Contact devices of this kind have found wide use in electromagnetic relays, even in relays of the polarized type, and a relay may comprise a plurality of such contact devices, the contact springs being arranged in one or more groups.

By indirect operation I mean a mode of operation according to which a contact closure is effected by two contacts being moved into engagement due to the action of the spring tension in at least one of the contact springs which is released e.g. by the energization or release of a relay. Thus no external forces are acting upon the contact springs during the closing process, whereas external means are used to keep the springs out of engagement when in non-operated position. In practice one (called the movable spring) of the springs of a contact device for indirect operation is pre-tensioned or biased so that it strives to move its contact end towards the contact end of the other spring (called the fixed spring), and in non-operated condition the movable contact spring is kept separated from the fixed contact spring by means of a lifting stud which may be operated e.g. by the armature of a relay.

Hitherto contacts with indirect operation have been used for the purpose of suppressing contact vibrations when two contacts strike against each other (are closed). The springs to which the contacts are attached, have been made relatively long with a low natural frequency of vibration whereby the contacts have approached each other relatively slowly so that the contact vibration at the first moment has been suppressed. Furthermore, the energy from detrimental vibrations of the movable contact springs has been dissipated due to friction between the contacts and/or between the contact springs of a spring set so that it has been possible to eliminate even slow contact vibrations due to the low natural frequency of vibration of the contact springs.

However, the abovementioned design of the contacts also involves certain drawbacks. Thus the contact devices become very susceptible to accelerations and retardations and to shakings within the resonant frequency range of the device, and consume large space and material and require considerable forces in order to yield rapid make and break functions when the contacts are removed from each other.

It is an object of the present invention to provide a contact device of the kind defined above which has no or little susceptibility to accelerations and retardations and in which contact vibrations and bouncing are effectively suppressed.

The contact device according to the invention is foremost characterized by the contact springs being pre-tensioned to such extent that they yield a force at the contact points amounting to at least 30 times, for example 50 times, the weight of the free end of the spring inclusive the contacts.

It will be easily understood that a contact device having this characteristic will have little susceptibility to accelerations and retardations, but it is by no means obvious that it will also be free from contact vibrations and bouncing on closure, for there is no simple relation between liability to contact vibrations and the ratio of the contact pressure to the weight of the free ends of the contact springs. However, I have found that a contact device having the abovementioned characteristic shows a surprisingly high freedom from contact vibrations. The movements performed by the contacts during a closing operation from the moment the contacts first touch each other till they have come to a state of rest or equilibrium, depend on a large number of factors, and therefore it has not been possible to explain theoretically the freedom from contact vibrations which is characteristic of the contact device according to the invention.

When the contact on the movable contact spring strikes the contact on the fixed contact spring, an elastic deformation of the contacts occurs, and thereby forces arise which strive to separate the contacts again. The movements of the contacts after the impact will not however be determined solely by the elasticity of the contacts but also to a high degree by the properties of the springs to which they are attached. On the contact closure the fixed contact spring will be deflected from its normal position and thereby exert a force on the contact on the movable spring which force has a direction opposite to the initial direction of movement of said contact. Furthermore, that part of the movable contact spring which is situated between the fixed end of the spring and the contact, will continue its movement after the contacts have first come into engagement, so that the movable spring will have a deflection between the fixed end and the contact. This deflection produces a force which also acts upon the contacts and may be considered as an addition to the contact pressure which exists between the contacts when they have reached the state of rest. The continued movements of the contacts after their elastic deformation has reached its maximum, will depend on these forces, and the mutual relations of these forces probably determine whether the contacts will reach the state of rest with or without repeated interruptions and closures. There are indications that the contacts will reach the state of rest without interruptions on the condition that the pressure existing between the conacts when their elastic deformation has reached its maximum, does not exceed the sum of the force caused by the abovementioned deflection of the movable contact spring and the contact pressure existing between the contacts when they have come to rest, but it has not been established to a certainty that the fulfilment of this condition is necessary or sufficient in order that contact vibrations shall be avoided. The movements of the contacts with respect to each other will of course also be dependent in a high degree on the natural frequencies of vibration of the contact springs and the phase angles of the vibrations occurring during the closure period. It has proved that the liability to contact bouncing is reduced if the natural frequency of vibration of the fixed contact spring is equal to or somewhat higher than that of the movable spring.

The contact pressure existing between the contacts when they have come to rest in engagement with each other, is determined by the dimensions and the material of the contacts and the contact springs, the initial tension of the springs and the distance between their fixed ends. These factors also determine the movements of the contacts during the closing process, and it is obvious that if a contact device is designed with a view to have a certain ratio of the contact pressure to the weight of the free ends of the contact springs, the movements of the contact during the closing process will also be de-

*of a fixed contact spring and arranged for indirect operation; said fixed contact spring being more rigid than either of its associated movable contact springs; both of said movable contact springs being pre-tensioned toward their associated fixed contact spring so as to yield at the contact points a force amounting to at least 50 times the weight of the movable part of the contact spring inclusive contacts and wherein the natural frequency of vibration of the fixed contact springs inclusive their contacts is somewhat higher than the natural frequency of vibration of the movable contact springs inclusive their contacts; and contact actuating means positioned between the movable contact springs and movable in one direction to a first fixed position to move the make-contact spring away from said fixed contact spring and allow the contact on the break-contact spring to close against the contact on the fixed contact spring solely due to said pre-tension force and movable in the other direction to a second fixed position to move the break-contact spring away from said fixed contact spring and allow the contact on the make-contact spring to close against the contact on the fixed contact spring solely due to said pre-tension force.*

*15. A switching device comprising in combination : an energizing coil; a magnet core; an armature; fixed contact springs; a pair of movable contact springs mounted on opposite sides of a fixed contact spring and adapted to alternately engage the fixed contact spring; said fixed contact springs being more rigid than the movable contact springs; said movable contact springs each being pre-tensioned so that their free ends are biased toward their associated fixed contact springs to yield at the contact points a force amounting to at least 50 times the weight of the movable part of the contact spring inclusive the contacts; a pre-tensioning spring; and contact actuating means positioned between the pair of movable contact springs and movable to a first fixed position to move one of said pairs of movable contact springs away from its associated fixed contact spring and allow the contact on the other of said pair of movable contact springs to close against the contact on the fixed contact spring solely due to said pre-tension force of said other movable contact spring, and movable to a second fixed position to move said other movable contact spring away from said fixed contact spring and allow the contact on said one movable contact spring to close against the contact on said fixed contact spring solely due to said pre-tension force of said one movable contact spring; said actuating means being operatively associated with said armature and said pre-tensioning spring and the pre-tensioning spring being tensioned to exert a force upon the contact actuating means which force is oppositely directed to the force exerted upon the contact actuating means by the armature when attracted.*

References Cited by the Examiner

The following references, cited by the Examiner, are of record in the patented file of this patent or the original patent.

UNITED STATES PATENTS

| | | | |
|---|---|---|---|
| 1,697,872 | 1/29 | Johnson | 200—166 |
| 2,178,656 | 11/39 | Swenson | 200—87 |
| 2,282,687 | 5/42 | Vigren et al. | 200—1 |
| 2,290,725 | 7/42 | Bartels et al. | 200—166 |
| 2,339,610 | 1/44 | Baker | 200—104 |
| 2,368,201 | 1/45 | Clare | 200—104 |
| 2,393,901 | 1/46 | Haigh et al. | 200—104 |
| 2,562,091 | 7/51 | Harrison | 200—104 |
| 2,577,468 | 12/51 | Knos | 200—104 |
| 2,587,458 | 2/52 | Tritts | 200—166 |
| 2,590,996 | 4/52 | Miloche | 200—104 |
| 2,612,367 | 9/52 | Blomquist | 200—1 |
| 2,616,993 | 11/52 | Koehler | 200—1 |

FOREIGN PATENTS

| | | |
|---|---|---|
| 730,125 | 5/55 | Great Britain. |
| 125,889 | 8/49 | Sweden. |

BERNARD A. GILHEANY, *Primary Examiner.*

APPARATUS FOR SORTING ARTICLES

Original Filed March 13, 1959 6 Sheets-Sheet 1

INVENTOR
PAUL E. SEABORN

BY Hans G. Hoffmeister
ATTORNEY